US006518338B2

(12) United States Patent
Colyer et al.

(10) Patent No.: US 6,518,338 B2
(45) Date of Patent: Feb. 11, 2003

(54) FAST DRYING ALKYD BASECOAT REFINISH COMPOSITION

(75) Inventors: Emerson Keith Colyer, Waterville, OH (US); Henry J. Stateczny, Whitehouse, OH (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/850,837

(22) Filed: May 8, 2001

(65) Prior Publication Data

US 2002/0169241 A1 Nov. 14, 2002

(51) Int. Cl.$^7$ ................................................ C08K 5/23
(52) U.S. Cl. ........................................................ 524/190
(58) Field of Search .......................................... 524/190

(56) References Cited

U.S. PATENT DOCUMENTS

| | | | |
|---|---|---|---|
| 3,382,294 A | 5/1968 | Christenson et al. | |
| 3,753,935 A | 8/1973 | Miller | |
| 4,291,135 A | 9/1981 | Höhlein et al. | |
| 4,396,672 A | 8/1983 | Adesko | |
| 4,447,567 A | 5/1984 | Geerdes et al. | |
| 4,455,331 A | * 6/1984 | Barsotti | 428/446 |
| 4,590,235 A | * 5/1986 | Troy | 524/439 |
| 4,973,621 A | 11/1990 | Buter | |
| 4,978,708 A | 12/1990 | Fowler et al. | |
| 5,244,979 A | 9/1993 | Yamamoto et al. | |
| 5,286,782 A | 2/1994 | Lamb et al. | |
| 5,314,953 A | 5/1994 | Corcoran et al. | |
| 5,322,715 A | 6/1994 | Jouck et al. | |
| 5,445,850 A | 8/1995 | Das et al. | 427/407.1 |
| 6,013,326 A | 1/2000 | Flosbach et al. | 427/407.1 |

FOREIGN PATENT DOCUMENTS

| WO | WO 97/22421 | 6/1997 | B05D/7/00 |
|---|---|---|---|

OTHER PUBLICATIONS

Emerson Keith Colyer and Douglas H. Larrow, U.S. patent application No. 09/886,742, filed Jun. 21, 2001.
Ali Rihan and Emerson Keith Colyer, U.S. patent application No. 09/965,423, filed Sep. 27, 2001.

\* cited by examiner

*Primary Examiner*—Edward J. Cain
(74) *Attorney, Agent, or Firm*—Anna M. Budde

(57) ABSTRACT

A refinish basecoat composition includes an alkyd resin, at least one pigment dispersed by resin comprising the alkyd resin, and an hydroxyl-functional acrylic polymer. The acrylic polymer has a number average molecular weight of at least about 6000 and is polymerized using at least about 45% by weight cycloaliphatic monomer, based on total monomer weight polymerized. A mixer system that can be used to prepare the refinish basecoat has a plurality of color components, each independently including at least one pigment dispersed by resin including an alkyd resin, and a pigment-free component containing the hydroxyl-functional acrylic polymer.

23 Claims, No Drawings

FAST DRYING ALKYD BASECOAT REFINISH COMPOSITION

FIELD OF THE INVENTION

The present invention relates to automotive refinish compositions and to methods for preparing and using such compositions.

BACKGROUND OF THE INVENTION

Automotive topcoat finishes today are predominantly basecoat/clearcoat topcoats, in which the topcoat is applied in two layers, a first layer of a pigmented basecoat composition and a second layer of a clearcoat composition. Basecoat/clearcoat coatings are desirable for their high level of gloss and depth of color. In addition, basecoats having special effect pigments, e.g., flake pigments such as metallic and pearlescent pigment, can achieve excellent gonioapparent effect in basecoat coatings.

In order to provide optimum match to the appearance of the original finish, automotive refinish topcoats are also being applied in separate layers of basecoat and clearcoat. Unlike the original finish coating compositions, which are typically cured at temperatures of 110° C. or higher, automotive refinish coatings must be formulated as either thermoplastic compositions or thermosetting compositions that cure at relatively low temperatures because many components of a finished vehicle cannot withstand high temperature bakes and because equipment large enough for a baked finish on a vehicle is very expensive. Nonetheless, thermosetting compositions are generally preferred as providing more durable and scratch- and mar-resistant coatings. Thermosetting refinish compositions are usually designed to cure at ambient temperatures. Although not developing full cure for hours or days, it is desirable to have the coating become "dry to handle," that is, not tacky, within a reasonably short time. A coating that is dry to handle in a short time allows shorter processing times, which improves the productivity of the paint shop. Shorter dry to handle times also reduce the chance that the coating could become contaminated with airborne particulates.

It is desirable to have quick drying basecoats in the application of basecoat/clearcoat systems for an additional reason. If the applied basecoat composition layer has not dried sufficiently before the clearcoat composition is applied, then the application of the clearcoat will disturb the basecoat layer and the appearance of the basecoat will be adversely affected. In particular, the metal control of metallic basecoats will suffer due to disturbance of the flake pigment by intermixing of the coating layers at their interface.

In thermosetting automotive refinish coating compositions the curing agent reacts with the main resin or polymer at room temperatures within a reasonable amount of time without heating or with heating at low temperatures of perhaps up to 150° F. Given the reactivity between the curing agent and the main resin or polymer at typical storage temperatures, these materials are segregated into separately stored components until just shortly before application of the coating composition to the substrate. This type of coating composition, in which the materials that react to cure the coating are segregated in two separately stored components, is referred to in the art as a "two-component" or "two-package" or "2K" coating composition. Refinish clearcoat compositions, which are unpigmented, are often two-package compositions. Refinish basecoat compositions, on the other hand, may also be formulated as two-component compositions for each desired each color or may instead be prepared from an intermix system including separately stored color components, a component having the main resin or polymer, a crosslinker component, and possibly other components.

Cost and solvent content are further concerns in formulating automotive refinish coating compositions. For example, cellulose acetate butyrate (CAB) resins have been used to shorten the dry to handle time and as rheology control additives to enhance metal control and other properties in refinish coatings, but coating compositions containing these CAB materials require an undesirably high amount of organic solvent. In addition, these CAB materials are relatively expensive and require added steps in the coatings manufacturing process. Finally, the CAB materials are specialty products that are not widely manufactured.

Certain curing agents, for example polyisocyanate crosslinkers, can be used to shorten tack-free times and for other properties, but are also relatively expensive. Using polyisocyanate crosslinkers in basecoats again increases the complexity in preparing and mixing refinish paints It would be desirable, therefore, to have a coating composition (or intermix system for preparing such a coating composition) with a short tack-free drying time, good metal control, that is less expensive, and that could be applied with a lesser amount of regulated emissions.

SUMMARY OF THE INVENTION

The invention provides a refinish basecoat composition including an alkyd resin, at least one pigment dispersed by the alkyd resin, optionally in combination with one or more further resins, and an hydroxyl-functional acrylic polymer. The hydroxyl-functional acrylic polymer has a number average molecular weight of at least about 6000 daltons and contains at least about 45% by weight of one or more cycloaliphatic monomers. Preferably, the refinish basecoat is free of materials reactive with the acrylic polymer.

The invention further provides an intermix system for preparing the basecoat composition of the invention. The intermix system includes a plurality of color components, each containing at least one pigment dispersed by the alkyd resin, optionally in combination with one or more further resins; a pigment-free component containing the hydroxyl-functional acrylic polymer; and optional further components. An automotive refinish basecoat composition of any desired color can be produced by combining the intermix system components.

Still further, the invention provides a method of refinishing a substrate, which includes steps of applying the basecoat composition of the invention to a desired area of the substrate, allowing the applied basecoat layer to dry for up to about twenty minutes, and then applying over the basecoat layer a clearcoat composition. The clearcoat composition may contain at least one component reactive with the acrylic polymer of the basecoat composition. Reaction between that reactive component of the clearcoat composition and the acrylic polymer of the basecoat promotes intercoat adhesion, even if only a minor portion of the available acrylic polymer reacts. The alkyd of the basecoat may react with oxygen to crosslink and/or may crosslink through hydroxyl functionality.

It is particularly desirable for the clearcoat composition to be thermosetting in order to provide a durable, scratch- and mar-resistant coating. In the composite basecoat/clearcoat coating, the surface properties are provided by the clearcoat layer, thus the basecoat composition is not required to provide a hard, tough coating layer. The basecoat composition dries quickly with relatively low emissions of regulated materials. The composite coating of the basecoat and clearcoat has excellent adhesion to the substrate and excellent intercoat adhesion between the basecoat and clearcoat layers.

DETAILED DESCRIPTION OF THE INVENTION

The refinish basecoat composition includes an alkyd resin, at least one pigment dispersed by the alkyd resin or a combination of the alkyd resin and one or more further resins, and an hydroxyl-functional acrylic polymer.

First, the basecoat composition includes an alkyd resin. Alkyd resins are prepared using unsaturated oils and may chemically dry by oxidation (i.e., crosslink through the double bonds in the presence of the oxygen in the air). The alkyd resin may also crosslink through hydroxyl functionality with a hydroxyl-reactive component in the basecoat composition or in the clearcoat composition, preferably in the clearcoat composition. Alkyd resins are desirable for a number of reasons. Alkyd resins are relatively inexpensive resins. Because alkyd resins may cure through oxidation, they do not need a separate crosslinking agent that would require separate storage and increase the complexity of an intermix system for preparing the basecoat composition. Thirdly, alkyd resins are good dispersing resins for a wide variety of pigments. It is also important for the alkyd resin to be compatible with the acrylic polymer, particularly in that the alkyd and the acrylic are miscible with each other in solution.

The basecoat may include a metal drier to promote the oxidative cure of the alkyd, optionally in conjunction with one or more further resins. Suitable examples of metal driers include, without limitation, cobalt naphthenate, calcium naphthenate, zinc naphthenate, zirconium naphthenate, and combinations of these.

The basecoat composition further includes one or more pigments dispersed by the alkyd resin. Virtually any organic or inorganic color pigment may be included. Examples of suitable classes of organic pigments that may be used include, without limitation, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Examples of suitable inorganic pigments include, without limitation, metal oxide pigments such as titanium dioxide, iron oxides including red iron oxide, black iron oxide, and brown iron oxide, and chromium oxide green; carbon black; ferric ferrocyanide (Prussian blue); ultramarine; lead chromate; and so on.

The color pigment or pigments are dispersed in the alkyd resin or in the combination of resins including the alkyd resin according to known methods. In general, the pigment and alkyd resin (or alkyd resin and other resin(s)) are brought into contact under a shear high enough to break the pigment agglomerates down to the primary pigment particles and to wet the surface of the pigment particles with the alkyd resin. The breaking of the agglomerates and wetting of the primary pigment particles are important for pigment stability and color development. When the pigment dispersion is used to make a color component of the intermix system, then the pigment dispersion may be further adjusted with alkyd resin, solvent, and/or other materials as needed so that the color components of the intermix system can be used together to produce the universe of desired refinish coating colors.

Metallic basecoat colors are produced using one or more special flake pigments. Metallic colors are generally defined as colors having gonioapparent effects. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance when viewed at different angles.

Unlike the solid color pigments, the flake pigments do not agglomerate and are not ground under high shear because high shear would break or bend the flakes, diminishing or destroying the gonioapparent effects. The flake pigments are satisfactorily dispersed in the alkyd resin or combination of resins including the alkyd resin by stirring under low shear.

The refinish basecoat composition also includes an hydroxyl-functional acrylic polymer. The hydroxyl-functional acrylic polymer has a number average molecular weight of at least about 6000, preferably at least about 8000, and even more preferably at least about 10,000. The hydroxyl-functional acrylic polymer also preferably has a weight average molecular weight of at least about 17,000, more preferably at least about 19,000, and even more preferably at least about 21,000 Molecular weights may be determined by gel permeation chromatography using polystyrene standards.

The acrylic polymer is polymerized using one or more cycloaliphatic monomers. Suitable examples of cycloaliphatic monomers include, without limitation, cyclohexyl (meth)acrylate, (meth)acrylate esters of alkyl-substituted cyclohexanol, and (meth)acrylate esters of alkanol-substituted cyclohexane, such as 2-tert-butyl and 4-tert-butyl cyclohexyl (meth)acrylate, 4 cyclohexyl-1-butyl (meth)acrylate, and 3,3,5,5,-tetramethyl cyclohexyl (meth)acrylate; isobornyl (meth)acrylate; isomenthyl (meth)acrylate; cyclopentyl (meth)acrylate, (meth)acrylate esters of alkyl-substituted cyclopentanols, and (meth)acrylate esters of alkanol substituted cyclopentanes; adamantanyl (meth)acrylates; cyclododecyl (meth)acrylate; cycloundecanemethyl (meth)acrylate; dicyclohexylmethyl (meth)acrylate; cyclododecanemethyl (meth)acrylate; menthyl (meth)acrylate; and so on, as well as combinations of these. The term (meth)acrylate is used herein to indicated both the acrylate ester and the methacrylate ester. Preferred among these are cyclohexyl (meth)acrylate and isobornyl (meth)acrylate.

The cycloaliphatic monomer units are included in the acrylic polymer in amounts of at least about 45% by weight, preferably at least about 60% by weight, and more preferably at least about 65% by weight of the polymer. It is advantageous for the cycloaliphatic monomer units to be included in the acrylic polymer in amounts of up to about 85% by weight, particularly up to about 80% by weight, and especially up to about 75% by weight of the polymer. The upper limit on the amount of cycloaliphatic monomer unit depends upon factors such as the particular monomer used, the viscosity obtained in the acrylic polymer using the monomer, the amount of hydroxyl monomer and other monomers used, and so on.

The acrylic polymer also has hydroxyl functionality. Hydroxyl functionality can conveniently be introduced to the polymer by copolymerizing at least one hydroxyl-functional monomer. Suitable examples of hydroxyl-functional monomers include, without limitation, hydroxyethyl (meth)acrylate, hydroxypropyl (meth)acrylates, hydroxybutyl (meth)acrylates, and combinations of these. Preferably, at least about 5% by weight hydroxyl-functional monomer is included in the polymer. It is also preferred to include up to about 15% by weight hydroxyl-functional monomer in the polymer. Hydroxyl functionality may also be introduced through thio-alcohol compounds, including, without limitation, 3 mercapto-1-propanol, 3-mercapto-2-butanol, 11-mercapto-1-undecanol, 1 mercapto-2-propanol, 2-mercaptoethanol, 6-mercapto-1-hexanol, 2 mercaptobenzyl alcohol, 3-mercapto-1,2-proanediol, 4-mercapto-1-butanol, and combinations of these. Hydroxyl functionality may also be introduced to the acrylic polymer, for example, by reaction of the polymer with a material that contains or produces hydroxyl functionality, e.g. ring-opening of an epoxide group. In one preferred embodiment, the acrylic polymer has an hydroxyl number of at least about 15 mg KOH/g polymer, more preferably at least about 40 mg KOH/g polymer, yet more preferably at least about 45 mg KOH/g polymer, and still more preferably at least about 50 mg KOH/g polymer. It is also preferred for the acrylic polymer to have an hydroxyl number of up to about 115 mg KOH/g polymer, more preferably up to about 90 mg KOH/g polymer, more preferably up to about 75 mg KOH/g polymer, still more preferably up to about 60 mg KOH/g polymer. The hydroxyl functionality may be incorporated by any method or by any combination of methods.

Other monomers may be copolymerized with the cycloaliphatic monomer and the hydroxyl monomer (and/or the hydroxy thiol compound and/or monomer that provides hydroxyl functionality through further reaction after polymerization). Examples of suitable co-monomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, lauryl, and stearyl acrylates, methacrylates, and crotonates; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of co-polymerizable vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The co-monomers may be used in any combination. In one preferred embodiment, the acrylic polymer is prepared using a mixture of monomers that includes styrene and methyl methacrylate (at least about 1 % and up to about 20% by weight in combination, based on the total weight of monomers polymerized) and an acrylic or methacrylic ester having at least about six carbon atoms that is not a cycloaliphatic monomer (at least about 0.5% and up to about 20% by weight, based on the total weight of monomers polymerized). The acrylic polymer should be formulated to have a useful viscosity in view of regulatory constraints on volatile organic compounds. The monomers are selected and apportioned so that a 50% by weight solution of the acrylic polymer in n-butyl acetate has a viscosity preferably less than or equal to 6.3 Stokes at 25° C., more preferably less than or equal to 5.8 Stokes at 25° C., and still more preferably less than or equal to 5.5 Stokes at 25° C.

The acrylic polymer may be prepared using conventional techniques, such as by heating the monomers in the presence of a polymerization initiating agent and optionally chain transfer agents. The polymerization is preferably carried out in solution, although it is also possible to polymerize the acrylic polymer in bulk.

Typical initiators are organic peroxides such as dialkyl peroxides such as di-t-butyl peroxide, peroxyesters such as t-butyl perooctoate and t-butyl peracetate, peroxydicarbonates, diacyl peroxides, hydroperoxides such as t-butyl hydroperoxide, and peroxyketals; azo compounds such as 2,2'azobis (2 methylbutanenitrile) and 1,1'-azobis (cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes.

The refinish basecoat composition may contain other materials, including other resins or polymers used in combination with the alkyd resin to disperse the pigments, such as acrylics, polyesters, and/or polyurethanes; and additives such as rheology control agents, matting agents, surfactants, fillers (e.g., talc or barytes), stabilizers, wetting agents, dispersing agents, adhesion promoters, fillers, UV absorbers, hindered amine light stabilizers, and so on. Optionally, the invention may include one or more waxes such as poly (ethylene-vinyl acetate) copolymers or other rheology control agents. Rheology control agents are added to improve the appearance and/or evenness of the basecoat, particularly the metallic appearance of metallic basecoats.

Preferably, the refinish basecoat is free of materials reactive with the acrylic polymer. When there is no crosslinker for the acrylic polymer included in the composition, the basecoat composition may be formulated as a one-component (one-package) paint. Alternatively, the basecoat composition may include a crosslinking agent reactive with the acrylic polymer and optionally with hydroxyl functionality on the alkyd resin, for example a polyisocyanate such as, but not limited to, the isocyanurate of hexamethylene diisocyanate. The crosslinking agent is kept separately from the acrylic polymer until just prior to application, as a two-component (two-package) paint.

In another embodiment, the invention provides an intermix system for preparing the basecoat composition of the invention. The intermix system includes a plurality of color components, each of which independently contains at least one pigment dispersed by at least the alkyd resin; a pigment-free component containing the hydroxyl-functional acrylic polymer of the basecoat composition; and optional further components.

The color components of the intermix system are formulated so that the system can produce the refinish basecoat composition of the invention in any desired color. The intermix system has at least about 30 color components, but may contain as many as 60 or more color components. It is desirable to minimize the number of color components as much as possible for simpler formulation and lower cost, but a sufficient number of color components must be included so that any desired automotive refinish color can be formulated.

The color components may be formulated so that the refinish basecoat composition will generally have substantially the physical properties, e.g. by having substantially the same weight ratio of alkyd resin to acrylic polymer (based on nonvolatile weights) regardless of which color components are needed to prepared the desired basecoat color. The alkyd resin is used to disperse the pigment in the color component, but some pigments or combinations of pigments require more resin to form a stable dispersion of suitable viscosity. The pigments, including flake pigments, may be included in amounts of from about 2% to about 35% by weight of the nonvolatile portion of the color component, depending upon the particular pigment or pigments included. More alkyd resin may be added to color components as needed so that each color component will contribute the desired amount of alkyd resin to the basecoat composition.

The intermix system further includes a pigment-free component containing the hydroxyl-functional acrylic polymer of the basecoat composition, described above. The intermix system may include optional further components, such as a crosslinker component containing a crosslinker reactive with the hydroxyl-functional acrylic polymer and/or a reducing solvent component.

The basecoat composition may include one or more solvents. In general, the solvent can be any organic solvent or solvents suitable for the alkyd and/or acrylic polymer. The solvent or solvents may be selected from aliphatic solvents or aromatic solvents, for example ketones, esters, acetates, toluene, xylene, aromatic hydrocarbon blends, or a combination of any of these.

In the intermix system, the solvent can be included in any of the components, and the intermix system may include an additional solvent-containing component other than the color components and the acrylic polymer-containing component. Generally, each of the components will include one or more kinds of organic solvent.

The refinish basecoat of the invention is applied in a layer to a desired area of the substrate to be refinished. The applied basecoat layer is allowed to dry, and then a clearcoat composition is applied in a layer over the basecoat composition layer. The basecoat composition of the invention provides an advantage in that the clearcoat composition can be applied in as short a time as 5 minutes after application of the basecoat layer. In general, no more than about 20 minutes of dry time is required before the clearcoat composition is applied.

A layer of a clearcoat composition is applied over the layer of dried basecoat. The clearcoat composition may include a material reactive with the acrylic polymer and, optionally, the alkyd of the layer of basecoat composition. For example, the clearcoat composition may include a crosslinker reactive with hydroxyl functionality, such as an isocyanate-functional crosslinking agent, for example and without limitation the isocyanurate of hexamethylene diisocyanate.

After application of the clearcoat layer, the composite coating is cured by at ambient temperatures, by low temperature baking (e.g., typical automotive refinish bake schedule), or by air drying (oxidative cure). Oxidative cure of the alkyd resin of the basecoat may take place over a period of days by diffusion of oxygen through the clearcoat layer.

The refinished substrate may be an automotive vehicle or a component of an automotive vehicle. The coating compositions of the invention may, however, be applied to other articles for which a protective and/or decorative coating is desirable. Such articles may be those having parts or substrates that cannot withstand high temperature curing conditions or that cannot easily be placed in a high-bake oven.

The invention is further described in the following examples. The examples are merely illustrative and do not in any way limit the scope of the invention as described and claimed. All parts are by weight unless otherwise indicated.

EXAMPLE 1

Preparation of Modifying Mixture

An acrylic resin was prepared by polymerizing in 24.61 parts by weight n-butyl acetate a total of 48.47 parts by weight of a Mixture A of 73.73 parts by weight of cyclohexyl methacrylate, 12.09 parts by weight of 2-hydroxyethyl methacrylate, 13.63 parts by weight of addition polymerizable comonomers, and 0.56 parts by weight of 2-mercaptoethanol with 6.88 parts by weight of Mixture B of 0.44 parts by weight of initiator for the addition polymerization and 99.56 parts by weight of n-butyl acetate and 6.15 parts by weight of a Mixture C of 96.98 parts by weight n-butyl acetate and 3.02 parts by weight of a second initiator for the addition polymerization. A total of 3.46 parts by weight of n-butyl acetate was used to flush the addition lines. The reaction mixture was held at the reaction temperature to complete the polymerization, then cooled and 10.42 parts by weight of methyl ethyl ketone were added to the cooled resin. The acrylic resin had a number average molecular weight of about 8700.

A portion of 83.8 parts by weight of the acrylic resin product was combined with 31.9 parts by weight of a wax dispersion (10% by weight in xylene) and 4.3 parts by weight of a matting agent.

EXAMPLE 2

Preparation of Basecoat Coating Composition

A black basecoat coating composition was prepared by combining 1 part by volume of the Modifying Mixture of Example 1 with 2 parts by volume of an alkyd-based color dispersion of about 2.5% by weight black pigment and about 46% by weight alkyd resin on total nonvolatile material weight. The mixture was reduced 50% by volume with solvent reducer.

Comparative Example A

A comparative black basecoat coating composition was prepared by combining 1 part by volume of a polyisocyanate-containing component (about 15.25% by weight of active isocyanate) with 8 parts by volume of the alkyd based color dispersion of Example 2 and 4 parts by weight of the solvent reducer of Example 2.

Comparative Example B

A comparative acrylic polymer was prepared according to the procedure of Example 1, but using a monomer mixture containing 17,9 parts by weight of hydroxypropyl methacrylate, 13.4 parts by weight of isobornyl methacrylate, 0.2 parts by weight of mercaptoethanol, and 68.4 parts by weight of addition polymerizable comonomers. The acrylic polymer was used to prepare a Comparative Modifying Mixture B in the same way as in Example 1.

A black basecoat coating composition was prepared by combining 1 part by volume of the Comparative Modifying Mixture B with 2 parts by volume of the alkyd-based color dispersion of Example 2 The mixture was reduced 50% by volume the solvent reducer of Example 2.

Testing

The basecoat coating compositions of Example 2 and Comparative Examples A and B were each sprayed to hiding onto a substrate, and the drying times of the compositions were observed. A commercial refinish clearcoat was applied, and the appearance of the clearcoated substrate was observed.

The Example 2 sample was tack-free time at about 5 minutes, at which time the commercial refinish clearcoat was applied. The clearcoat formed a smooth, even layer.

The Comparative Example A sample was still tacky at 20 minutes, at which time the commercial refinish clearcoat was applied. The clearcoat formed a smooth, even layer.

The Comparative Example B sample was still tacky after 20 minutes, at which time the commercial refinish clearcoat was applied to one-half of the panel. The clearcoat was severely cratered and did not form a satisfactory film. After 24 hours, the half of the panel that had not been clearcoated was still tacky.

EXAMPLE 3

Preparation of Silver Metallic Basecoat Coating Composition

A silver metallic basecoat coating composition was prepared by combining 1 part by volume of the Modifying Mixture of Example 1 with 2 parts by volume of an alkyd-based color dispersion of about 4.5% by weight aluminum pigment and about 46% by weight alkyd resin on total nonvolatile material weight. The mixture was reduced 50% by volume with the solvent reducer of Example 2.

Comparative Example C

A comparative silver metallic basecoat coating composition was prepared by combining 1 part by volume of the polyisocyanate-containing component of Comparative Example A with 8 parts by volume of the alkyd based color dispersion of Example 3 and 4 parts by weight of the solvent reducer of Example 2.

Testing

The basecoat coating compositions of Example 3 and Comparative Example C were each sprayed to hiding onto a substrate. A commercial refinish clearcoat was applied after 5 minutes to the basecoat layer formed from Example 3 and after 20 minutes to the basecoat layer formed from Comparative Example C, and the appearance of the coated substrates were observed. The coated substrate prepared with the basecoat composition of Example 3 had markedly better metallic effect compared to the coated substrate prepared with the basecoat composition of Comparative Example C.

The invention has been described in detail with reference to preferred embodiments thereof. It should be understood, however, that variations and modifications can be made within the spirit and scope of the invention.

What is claimed is:

1. A refinish basecoat composition comprising an alkyd resin, at least one pigment dispersed by resin comprising the alkyd resin, and an hydroxyl-functional acrylic polymer, wherein the acrylic polymer has a number average molecular weight of at least about 6000 and is polymerized using at least about 45% by weight of a cycloaliphatic monomer, based on the total weight of monomers polymerized.

2. A refinish basecoat composition according to claim 1, wherein the refinish basecoat is free of materials reactive with the acrylic polymer.

3. A refinish basecoat composition according to claim 1, further comprising at least one metal drier.

4. A refinish basecoat composition according to claim 1, further comprising at least one flake pigment.

5. A refinish basecoat composition according to claim 1, wherein the acrylic polymer has a weight average molecular weight of at least about 17,000.

6. A refinish basecoat composition according to claim 1, wherein the cycloaliphatic monomer comprises a member selected from the group consisting of cyclohexyl acrylate, cyclohexyl methacrylate, isobornyl acrylate, isobornyl methacrylate, and combinations thereof.

7. A refinish basecoat composition according to claim 1, wherein the cycloaliphatic monomer is at least about 60% by weight, based on the total weight of monomers polymerized.

8. A refinish basecoat composition according to claim 1, wherein the cycloaliphatic monomer is up to about 85% by weight, based on the total weight of monomers polymerized.

9. A refinish basecoat composition according to claim 1, wherein the acrylic polymer has an hydroxyl number of from about 45 mg KOH/g polymer to about 75 mg KOH/g polymer.

10. A refinish basecoat composition according to claim 1, wherein the acrylic polymer is polymerized from monomers comprising from about 1% to about 20% by weight of a combination of styrene and methyl methacrylate, based on the total weight of monomers polymerized, and from about 0.5% and up to about 20% by weight of at least one acrylic or methacrylic ester having at least about six carbon atoms that is not cycloaliphatic, based on the total weight of monomers polymerized.

11. A refinish basecoat composition according to claim 1, wherein a 50% by weight solution of the acrylic polymer in n-butyl acetate has a viscosity less than or equal to 6.3 Stokes at 25° C.

12. A refinish basecoat composition comprising an alkyd resin, at least one pigment dispersed by the alkyd resin, and an hydroxyl-functional acrylic polymer, wherein the acrylic polymer has a number average molecular weight of at least about 8000 and is polymerized using from about 60% to about 80% by weight of a cycloaliphatic monomer, based on the total weight of monomers polymerized.

13. A refinish basecoat composition according to claim 12, wherein a 50% by weight solution of the acrylic polymer in n-butyl acetate has a viscosity less than or equal to 5.8 Stokes at 25° C.

14. A refinish basecoat intermix system, comprising
    (a) a plurality of color components each independently comprising at least one pigment dispersed by resin comprising an alkyd resin and
    (b) a pigment-free component containing an hydroxyl-functional acrylic polymer that has a number average molecular weight of at least about 6000 and is polymerized using at least about 45% by weight of a cycloaliphatic monomer, based on the total weight of monomers polymerized,
    wherein the color components are related such that a refinish basecoat composition of any desired color can be produced by combining the intermix system components.

15. A refinish basecoat intermix system according to claim 14, wherein the intermix system comprises at least about 30 color components.

16. A refinish basecoat intermix system according to claim 14, further comprising a component containing a crosslinker reactive with the hydroxyl-functional acrylic polymer.

17. A method of refinishing a substrate, comprising steps of:
    (a) applying to a desired area of the substrate a layer of a refinish basecoat composition comprising an alkyd resin, at least one pigment dispersed by resin comprising the alkyd resin, and an hydroxyl-functional acrylic polymer, wherein the acrylic polymer has a number average molecular weight of at least about 6000 and is polymerized using at least about 45% by weight of a cycloaliphatic monomer, based on the total weight of monomers polymerized;
    (b) allowing the applied layer of basecoat composition to dry for up to about twenty minutes; and
    (c) applying over the layer of basecoat composition a clearcoat composition.

18. A method according to claim 17, wherein the clearcoat composition is thermosetting.

19. A method according to claim 17, wherein the clearcoat composition comprises at least one material reactive with the acrylic polymer of the layer of basecoat composition.

20. A method according to claim 19, wherein the material reactive with the acrylic polymer of the layer of basecoat composition comprises the isocyanurate of hexamethylene diisocyanate.

21. A method according to claim 17, wherein the basecoat composition is dry to handle at about five minutes after application.

22. A method according to claim 17, wherein the substrate is an automotive vehicle or a component of an automotive vehicle.

23. A refinished substrate prepared according to the method of claim 17.

* * * * *